May 17, 1960 H. ARTER ET AL 2,936,515
MAGNETIC CHUCK
Original Filed Nov. 15, 1952 2 Sheets-Sheet 1
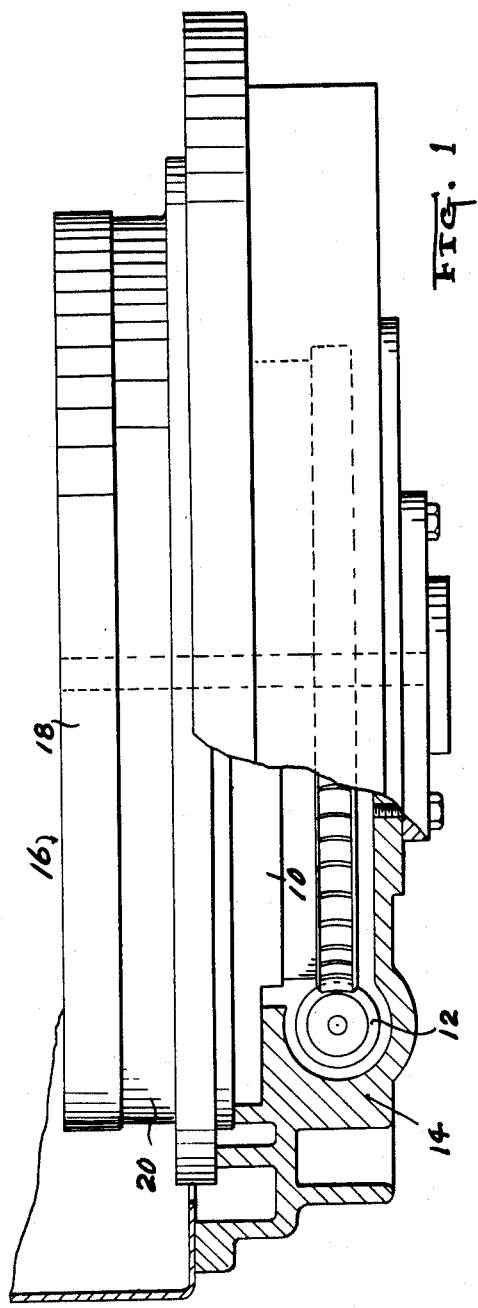
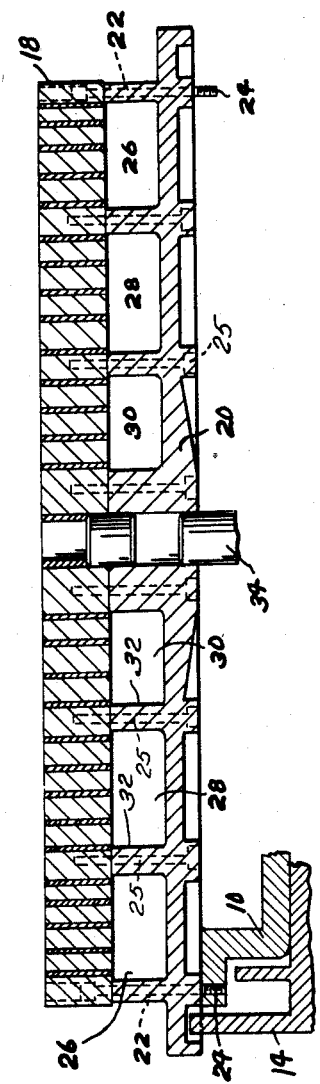
INVENTORS
HARRY ARTER +
BY ARLON G. SANGSTER
Charles P. Fay,
ATTORNEY

INVENTORS
HARRY ARTER +
ARLON G. SANGSTER
BY
ATTORNEY

United States Patent Office 2,936,515
Patented May 17, 1960

2,936,515

MAGNETIC CHUCK

Harry Arter, Worcester, and Arlon G. Sangster, Leominster, Mass., assignors, by mesne assignments, to Sundstrand Corporation, a corporation of Illinois Original application November 15, 1952, Serial No. 320,795. Divided and this application September 16, 1955, Serial No. 534,793

4 Claims. (Cl. 29—155.59)

This application is a division of our prior application Serial No. 320,795, filed November 15, 1952, now abandoned, and relates to new and improved magnetic chucks and similar holding devices, and the principal object of the present invention resides in the provision of a new and improved chuck design that is greatly simplified over the prior art while retaining and enhancing the holding power of the chuck, the novel magnetic chuck of the present invention being much thinner or less in height, cheaper and faster to manufacture, lighter in weight, and still retaining the qualities of prior art chucks.

Another object of the invention resides in the provision of a top plate for a magnetic chuck comprising a single piece of magnetic material provided with a series of relatively narrow slots cut therein and arranged substantially concentrically but with gaps to provide for radial solid portions that are not cut to retain the rigidity and strength of the metal, said gaps being filled with non-magnetic material and providing a series of narrow gaps alternating with wider magnetic flux-carrying portions, said top plate being such as to be directly placed on the box of the chuck containing the coils or magnets providing the flux, thus completely doing away with the prior art spreader plate normally required in order to properly distribute the magnetic lines of force, but obviated in the present case due to the construction of the top plate and due to the combination of the top plate and the coil box construction.

Another object of the invention resides in the provision of a novel method of making the top plate in pairs by flame cutting a series of generally concentric narrow slots in a pair of plates, welding the two plates together at the edges thereof, applying non-magnetic welding material to the then exposed edges of the slots so as to form trenches or recesses that may be easily and quickly filled with non-magnetic material, separating the plates by removing the circumferential weld, and then filling the trenches or recesses with non-magnetic material to form the non-magnetic gaps or barriers.

Other objects and advantages of the invention will appear hereinafter.

Reference is to be had to the accompanying drawings, in which:

Fig. 1 is a view in side elevation showing the exterior appearance of the new chuck, parts of the machine to which it is applied being shown in section;

Fig. 2 is a diametrical section through the chuck;

Figure 3:
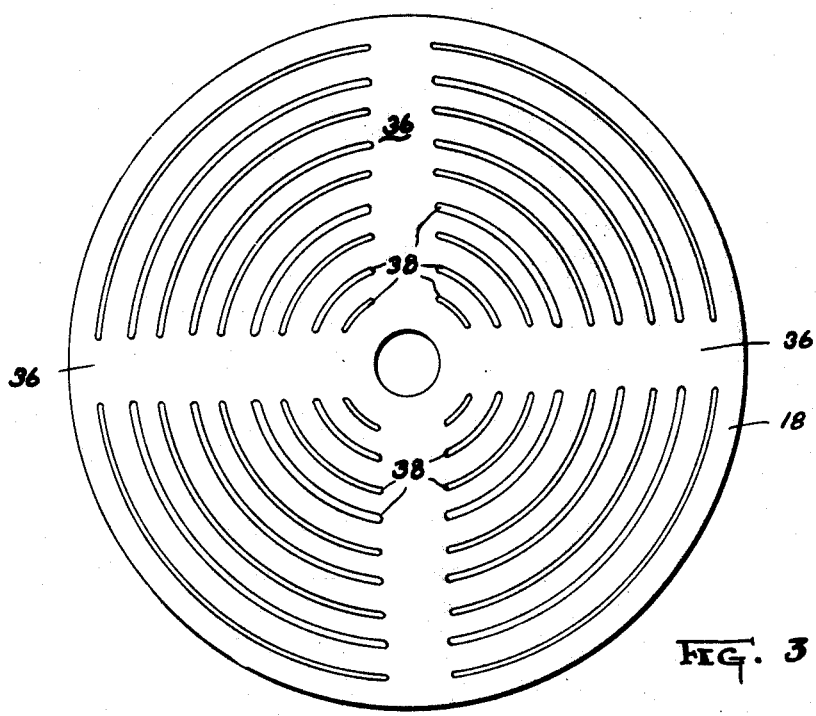
Fig. 3 is a plan view of the top plate.
Figure 4:
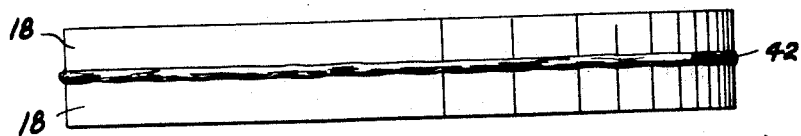
Fig. 4 illustrates a step in the method of making the same.

To illustrate the present case, the novel chuck is elected to be shown as being of circular form adapted to be secured to the rotating bed 10 of a machine tool such as a surface grinder, the bed being rotated by a worm or the like 12 mounted in the body of the machine 14. The chuck itself is generally indicated at 16 and comprises a top plate 18 and a box 20, the latter containing the magnetic flux producing coils or magnets. Whereas the invention is thus disclosed in a practical form as being applied to a rotary chuck, the invention is not necessarily limited to such a rotary chuck.

Construction of the new chuck is extremely simple and is shown in section in Fig. 2 as comprising the top plate 18 bolted to the box 20, as for instance by through bolts 22, that may also take into the rotating table 10 as indicated by the exposed threaded ends of the bolts at 24, and bolts 25 that extend from the box into the plate. Also as shown, the box 20 comprises a series of annular grooves 26, 28, 30, that are open at their tops and closed by the top plate, as is clearly apparent. The grooves are separated by upstanding rings or lands 32, accommodating bolts 25. The rings 32 are arranged concentrically and at distances from the center 34 such as to provide for an even flux distribution in the top plate, it being recognized that the coils to be held in the grooves increase in diameter from groove 30 radially outwardly. It is to be observed that the number of coils and spacing thereof may be varied to suit the size of the chuck, but it is also desirable to so space the annular coils as to provide uniform flux distribution over the gaps in the top plate.

The top plate itself is shown as comprising a single solid metal disc of appropriate thickness. The pole pattern is shown best in Fig. 3 and the chuck is simply a single solid piece of magnetic material provided with a series of concentric gaps arranged with regard to the coils in the box, so as to provide a uniform flux distribution throughout the entire top plate. The gaps are in the form of interrupted circles, so that the radial portions of the top plate indicated at 36 provide physical strength without loss of flux density and it will be apparent that very small workpieces may be held to the top plate illustrated.

Figure 5:
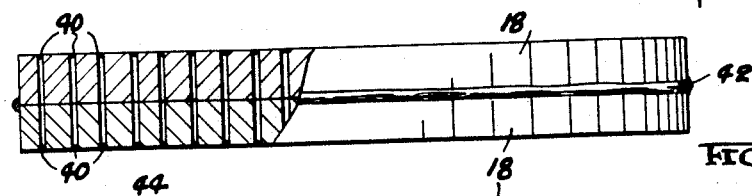
Fig. 5 is a view similar to Fig. 4 but having parts in section.
Figure 6:
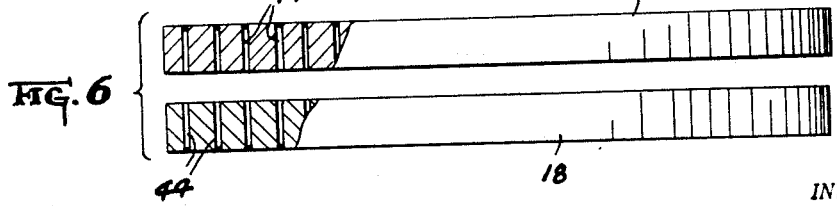
Fig. 6 illustrates the parts of Fig. 5 separated and ready for the final step of filling the trenches or recesses of the top plate with non-magnetic material.

The solid magnetic plate is flame cut from top to bottom on the arcs shown in Fig. 3. It is necessary of course to fill the flame cut slots with non-magnetic material as by pouring the material in a fluid state and allowing it to harden. In order to do this it is necessary to provide a dam or barrier at the bottom of each slot 38, and this is done by applying small amounts of welding material of non-magnetic nature at one side surface of the plate as best indicated in Figs. 5 and 6 at 40. However, if this is done to the plate in a free state, the same becomes warped due to the shrinking of the slots at one side thereof when the metal cools, and therefore this invention proposes to take two flame cut discs 18 and weld them together at the circumferential edges thereof as at 42. Then one weld 40 is provided to close a slot 44 at one side surface of the two combined plates and the corresponding welding barrier is provided at the opposite side surface thereof. The next weld 40 is made at the first side, and the fourth at the opposite side, etc. and thus the dams are provided alternately on the side surfaces of the two welded plates across the entire areas of the plates.

The side surfaces being thus processed alternately, the combined discs are annealed, and then the welding 42 is machined off. When separated, the discs are just as flat as originally made, and the slots may then be filled with the non-magnetic material in the usual way.

This process of making the top plate provides a practical means for achieving the desired result which is not otherwise obtainable since once one of the plates is warped, it is practically impossible to replace it in original flat state. These plates with the welds 40 cannot be heated and flattened, as this would weaken or even destroy these welds, as well as impairing the magnetic qualities of the plate itself.

As soon as the plates have been separated as in Fig. 6, the remaining recesses or trenches 44 produced by the welds 40 are filled with non-magnetic material and the top plate is completely finished except for polishing operations.

It will be seen that this invention provides an extremely simple and inexpensive magnetic chuck which may be produced faster and in greater quantity than those of the prior art; the new chuck does away with so-called spreader plates formerly thought to be necessary and desirable, provides an extremely practical and efficient pole pattern for holding pieces of either small or large size or a thick or thin section, and greatly reduces the height or thickness of the chuck.

Having thus described our invention and the advantages thereof, we do not wish to be limited to the details herein disclosed, otherwise than as set forth in the claims, but what we claim is:

1. The method of making top plates for magnetic holddevices comprising the steps of providing a pair of similar slotted magnetic members having generally flat parallel surfaces, securing the slotted member together in superimposed flat-wise condition against warping during welding, forming non-magnetic welds closing the slots in each member at one surface only of each member while the plates are so secured, and then separating the members after cooling.

2. The method of making top plates for magnetic holding devices comprising flame cutting a series of spaced coextensive slots through a pair of flat solid magnetic members, securing the slotted members together flatly by welding at the edges thereof, blocking each exposed slot edge alternately in the plates by welding the edges of a slot in one plate, then similarly welding the corresponding slot in the other plate until all slots are blocked, separating the members after cooling, and filling the closed slots with non-magnetic material.

3. The method of making top plates for magnetic holding devices comprising the steps of providing a pair of magnetic plates with through gaps therein, securing said plates flatwise together in generally coextensive superposed relation by welding at the plate edges, blocking the exposed edges of the gaps in both plates by non-magnetic welding at said gap edges, separating the plates after cooling, and filling the exposed, blocked gaps with non-magnetic material.

4. The method of making top plates for magnetic holding devices comprising the steps of providing a pair of magnetic plates with through gaps therein, said plates being substantially identical in composition and structure, securing said plates together in generally coextensive superposed relation by circumferentially welding said plates at the meeting edges thereof, blocking the exposed edges of the gaps in both plates by alternate non-magnetic welding at said gap edges at opposite side surfaces of the combined plates and with the same number and type of welds in each plate, separating the plates after cooling, and filling the exposed, blocked gaps with non-magnetic material.

References Cited in the file of this patent

UNITED STATES PATENTS

| | | |
|---|---|---|
| 1,232,512 | Downes et al. | July 10, 1917 |
| 2,388,737 | Gotha | Nov. 13, 1945 |
| 2,465,251 | Meier | Mar. 22, 1949 |